United States Patent [19]

Hampp et al.

[11] Patent Number: 5,223,355
[45] Date of Patent: Jun. 29, 1993

[54] PROCESS FOR IMPROVING THE SIGNAL-TO-NOISE RATIO IN HOLOGRAPHY USING BACTERIORHODOPSIN-BASED RECORDING MEDIA

[75] Inventors: Norbert Hampp; Ralph Thoma; Dieter Oesterhelt; Christoph Bräuchle, all of Munich, Fed. Rep. of Germany

[73] Assignee: Consortium fur elektrochemische Industrie GmbH, Munich, Fed. Rep. of Germany

[21] Appl. No.: 653,641

[22] Filed: Feb. 11, 1991

[30] Foreign Application Priority Data

Mar. 8, 1990 [DE] Fed. Rep. of Germany ....... 4007374

[51] Int. Cl.$^5$ .............................................. G03H 1/04
[52] U.S. Cl. ........................................... 430/1; 430/2; 359/3; 359/11; 365/124; 365/125
[58] Field of Search ................. 430/1, 2, 19; 356/347; 359/1, 3, 7, 11, 15, 29, 30; 365/124, 125

[56] References Cited

U.S. PATENT DOCUMENTS

| | | | |
|---|---|---|---|
| 4,728,165 | 3/1988 | Powell et al. | 430/2 |
| 5,011,756 | 4/1991 | Nikles | 430/19 |
| 5,023,859 | 6/1991 | Eich et al. | 430/19 |
| 5,050,117 | 9/1991 | McAulay | 364/713 |

FOREIGN PATENT DOCUMENTS

| | | | |
|---|---|---|---|
| 63-113533 | 5/1988 | Japan | 430/19 |
| 64-28631 | 1/1989 | Japan | 430/19 |

OTHER PUBLICATIONS

Politch et al. "Improved Polarizer Holography" Appl. Phy. Lett. 16 (Jun. 15, 1970) 496–498.
Vsevolodov et al. "Biological Light Senside Couplers as Technical information photocarriers"Biophysies 30 (1985) 962–967.
SPIE, vol. 1125 *Thin Films in Optics* (1989), "Optical Properties of Polymeric Films of Bacteriorhodopsin and Its Functional Variants: New Materials for Optical Information Processing," N. Hampp et al.
European Search Report dated Oct. 14, 1992.
Vsevolodov et al., "Holograms in biochrome, a biological photochromic material" *Soviet Physics Technical Physics*, Bd. 30, No. 10, 1985.
Patent Abstracts of Japan, vol. 10, No. 38, Feb. 14, 1986.
Rose et al., "Polarization Effects in Holography," *Applied Optics*, vol. 9, No. 1 Oct. 1970.
Okayama et al., "Polarization Effects in Holography," *Applied Physics*, vol. 19, No. 9, Nov. 1971.

*Primary Examiner*—Charles L. Bowers, Jr.
*Assistant Examiner*—Martin Angebrandt
*Attorney, Agent, or Firm*—Collard & Roe

[57] ABSTRACT

In processes of holography using bacteriorhodopsin-based recording media, it is essential to design the signal-to-noise ratio to be as favorable as possible. This is achieved by recording the hologram using circularly polarized light and reconstructing the hologram by using linearly polarized light, specific beam components being selected as a function of polarization in the beam path of the reconstructed hologram. The process is suitable both for purely holographic applications and also for other processes which include one or more intermediate or partial steps involving holography.

9 Claims, 4 Drawing Sheets

```
PXW
XDE
BCX
```

PROCESS FOR IMPROVING THE SIGNAL-TO-NOISE RATIO IN HOLOGRAPHY USING BACTERIORHODOPSIN-BASED RECORDING MEDIA

BACKGROUND OF THE INVENTION

The invention relates to a process for improving the signal-to-noise ratio in holography using bacteriorhodopsin-based recording media.

The application of bacteriorhodopsin or variants of bacteriorhodopsin as an active component in optical recording media is known. For example, Japanese application number JP 60/184246 A2, describes the recording, reading and transcription of data into thin bacteriorhodopsin films applied to a substrate. Also a general article by P. Kouyama et al., "Structure and Function of Bacteriorhodopsin", was published in *Adv. Biophys.* 24 (1988), pp. 123–175 and discusses the background of these possible practical applications.

In order to achieve greater stability in relation to thermal, chemical and photochemical decomposition or degradation, in optical recording media, preference is given to the use of bacteriorhodopsin and/or variants thereof as the active component. This is not in the form of free molecules, but in membrane-bound form, i.e., in the form of purple membrane or variants thereof, possibly comminuted.

The purple membrane can be obtained, for example, from *Halobacterium halobium*, and contains the photochromic protein bacteriorhodopsin. Variants of the purple membrane, i.e., those which contain variants of bacteriorhodopsin, may be obtained by known biotechnological processes. For example, variation of the retinal chromophores by means of chemical exchange or modification of the bacterio-opsin molecule are known processes (cf., for example, W. Gärtner, D. Oesterhelt, 1988, Methoxyretinals in Bacteriorhodopsin. Absorption Maxima, Cis-trans Isomerization and Retinal Protein Interaction, Eur. J. Biochem. 176:641–648, or Soppa, J. et al., 1989, Bacteriorhodopsin Mutants of Halobacterium spec. GRB. 1 or 2, J. Biol. Chem. 264: 13043–13048 and 13049–13056, respectively). Examples of such appropriate variants are also described in this article. Equally suitable are pigment systems related to bacteriorhodopsin. Some of these are halorhodopsin or sensorrhodopsin, which, just like bacteriorhodopsin, may occur in free, crystalline or membrane-bound form, in wildtype form or with a modified chromophore or a modified amino-acid sequence.

For reasons of simplification, the expression "bacteriorhodopsin-based recording media" is used in the text to denote such appropriate recording media, which contain bacteriorhodopsin, halorhodopsin or sensorrhodopsin or variants or mutants thereof as the active component. However, the remarks made in this connection are also applicable *mutatis mutandis* to other appropriate pigment systems, without specific reference being made thereto.

A particularly promising application of such bacteriorhodopsin-based recording media is to be found in holography. This includes not only the purely holographic processes but also those optical processes which include one or more partial steps involving holography.

In holography, preference is given to the use of the bacteriorhodopsin-based recording medium in the form of films or gels. These are embedded in carrier materials such as, for example, polymers, applied to substrates such as glass plates or in some other form permitting a reproducible laminar arrangement. The resultant advantages afforded include a favorable absorption range, a high attainable resolution, a large number of possible write/erase cycles, a high degree of storage stability, and high sensitivity and light-fastness. Application in color holography is also possible. This applies to all hologram types which are possible using bacteriorhodopsin-based recording media. These embodiments are frequently designated as type B holograms, in which a photoconversion of the initial state ($=$B) of the active component is carried out, or those types of holograms in which an intermediate state or photointermediate is subjected to a photoconversion. Advantageously for this purpose, an intermediate is selected, the absorption properties of which are markedly different from those of the initial state. Such an intermediate which may usefully be employed for holographic purposes is available, for example, in the form of the intermediate state—frequently designated as the M state—of naturally occurring bacteriorhodopsin.

A serious disadvantage which has prevented more widespread application in holography of bacteriorhodopsin-based recording media such as those which contain purple membrane is the unfavorable signal-to-noise ratio. This can be observed when using conventional recording and reproduction processes. The reason for this is the predetermined, relatively low diffraction efficiency of the purple membrane. Also the large proportion of scattered light present, which proportion is influenced by such factors as the particle size of the purple membrane particles, factors determined by the production process, such as mechanical stresses and refractive index discontinuities with respect to the matrix material, and factors determined by the operating conditions, such as dust and fluctuations in temperature or humidity.

SUMMARY OF THE INVENTION

It is therefore an object of the present invention to provide a process by means of which, when such recording media are used, the signal-to-noise ratio may be significantly improved, especially upon holographic reconstruction, and the proportion of scattered light can be significantly reduced.

These and other related objects are achieved by a process in which the recording of the hologram is carried out using circularly polarized light. The reconstruction of the hologram is then carried out using linearly polarized light, specific beam components being selected as a function of polarization in the beam path of the reconstructed hologram.

In a particularly simple and efficient embodiment of the process, the hologram is recorded with two mutually oppositely circular polarized waves which are used as a reference wave and an object wave. In this case, suitable radiation sources such as conventional lasers delivering coherent light are used. Preferably, lasers are used which operate in a wavelength range of 400 nm to 700 nm. Examples of such suitable laser light sources are gas lasers, dye lasers or diode lasers. In general, the visible wavelength range, and especially the blue wavelength range, have proved to be particularly expedient for the reference wave and object wave.

The mutually oppositely circular polarization of the object beam and reference beam can be achieved in the manner which is customary and known in optics. One possible method is, for example, the use of one or more λ/4 plates.

The bacteriorhodopsin-based recording medium can be used in the manner which is essentially known and which is suitable for holography. This applies both to the pigment systems already mentioned at the beginning, which are in principle possible, and also to the forms in which said recording medium can be introduced into the beam path, i.e., for example, in the form of a film or gel, embedded in polymers or applied to substrates such as glass plates. Suitable layer thicknesses are to be found within the range from 1 to 1000 μm, with the most advantageous thickness being 20 to 200 μm.

It has proven to be advantageous to use membrane-bound material, such as purple membrane, in comminuted form. In this form, the inhomogeneous particle diameter distribution, which is typical of non-comminuted material and which in general exhibits an average value of the order of magnitude of visible wavelengths, is homogenized and displaced to smaller average values. This can take place, for example, by subjecting the material, e.g., the purple membrane, to a treatment with ultrasonic waves. The comminution can achieve a further improved signal-to-noise ratio as compared with non-comminuted material.

According to the invention, the reconstruction of the hologram takes place with the use of linearly polarized light. As in the case of the generation of the object wave and reference wave, the known sources emitting coherent light radiation, i.e., preferably laser light sources, are also suitable for the generation of the reconstruction wave. This applies to a recording medium in the B state, as well as to one in an intermediate state.

The visible wavelength range and/or the range of the near infrared is advantageously selected. According to a preferred embodiment, differing wavelengths are used for the read beam and the object/reference beam. As a result, in real-time applications, the hologram dynamics or kinetics may be particularly easily observed. Thus, e.g., for holograms in which the object/reference waves give rise to a photoconversion of the initial state (type B holograms), a real-time observation of dynamic hologram changes is made possible by a reconstruction wavelength different from the object/reference wavelength. In the case of holograms in which the object/reference waves cause a photoconversion of an intermediate state (photointermediates), a second wave having a wavelength different from the first is required in order to populate the photointermediate state by excitation of the initial state ("optical pumping"). In this case, the pump wave can be used simultaneously as the read wave. This has the advantage that it is also possible to achieve an increase in the hologram efficiency, instead of a reduction, by increasing the intensity of the read/pump wave up to an optimal value. For example, when using wildtype bacteriorhodopsin as the recording medium and type M holography, yellow light has proved to be suitable for the read beam, if blue light was used for the recording.

Gas lasers, dye lasers or diode lasers may, for example, be used as radiation sources in the conventional manner.

The required linear polarization may be generated already within the laser or, e.g., may be ensured by means of filtering by linear polarizing filters (e.g., a Glan-Thompson polarizer).

In the course of the interaction between hologram and reconstruction (read) beam, the scattered light which is generated exhibits the same polarization as the read wave, i.e., is linearly polarized. However, the light from the reading beam passed by the hologram shows a high degree of elliptical polarization, the major semi-axis of the ellipse extending perpendicularly to the direction of polarization of the scattered light. This makes it possible to select specific beam components as a function of polarization in the beam path of the hologram beam.

In this procedure, the linearly polarized scattered light components are expediently filtered out. This can be achieved by a suitable filter, preferably a linear polarizing filter, inserted into the beam path of the reconstructed hologram. The filter is adjusted so that it is located in the blocking direction with respect to the direction of polarization of the read wave, i.e., approximately or precisely perpendicular thereto. In this arrangement, the scattered light can be almost entirely held back, while the beam of the reconstructed hologram is able to penetrate the polarizing filter without substantial attenuation of its intensity. As a result, when using conventional recording media containing purple membrane variants, it was possible to achieve signal-to-noise ratios which were better than with the conventional recording and reproduction processes by a factor of approximately 30. It was possible to detect the improvement, for example, by intensity measurement by means of photodiodes.

The linear polarizing filters employed may be, for example, the arrangements which are conventional in optics such as, for example, crystal-based or advantageously foil-based filters which have the distinguishing features of simple construction and handling.

Besides the selection—preferred within the context of the invention—by polarizing filters, it is in principle, for example, also possible to select the circular component in the reconstruction beam. This can take place by means of a transformation into linearly polarized light, for example, by means of a so-called λ/4 plate, as well as a subsequent filtering by a linear polarizing filter. However, this variant has the disadvantage that it is wavelength-dependent, so that the arrangement must be adjusted and optimized for each individual wavelength, and the diffracted intensity of circular light is lower, approximately by a factor of 3, than in the described configuration using a linearly polarized reference wave.

The process according to the invention is employed with particular advantage in those holographic processes in which a favorable signal-to-noise ratio is of importance, such as dynamic holographic information recording or data storage, optical filtering and optical pattern recognition. Good results were also achieved in real-time interferometry; however, in this case it is necessary to ensure an appropriate condition of polarization of the object beam, for example, by interposition of suitable filters.

BRIEF DESCRIPTION OF THE DRAWING

Other objects and features of the present invention will become apparent from the detailed description considered in connection with the accompanying drawing, which discloses several embodiments of the invention. It is to be understood that the drawing is to be used for the purpose of illustration only and not as definition of the limits of the invention.

FIG. 1 shows an image of the group in which "X"'s will be located.

DETAILED DESCRIPTION OF THE PREFERRED EMBODIMENT

The invention is explained in greater detail herein with reference to an illustration embodiment, which is given by way of example and not of limits:

EXAMPLE

A purple membrane file (layer thickness approximately 50 μm), which was applied to a glass plate having a thickness of approximately 1 mm and which contained wildtype bacteriorhodopsin as an active component, was used as the holographic recording medium. Prior to application, the purple membrane particles had been comminuted by the action of ultrasonic waves to such an extent that only slight absorption in the wavelength range from 700 to 800 nm could be still observed. The purple membrane was in the B state.

The glass plate provided with the film was now inserted, in the recording position, in an arrangement for optical pattern recognition using holographic methods. With this construction, which is frequently referred to as a "joint transform correlator" (cf. for example, N. Collings, *Optical Pattern Recognition Using Holographic Techniques*, Addison Wesley, Wokingham (1988)), it is possible, for example, to check how frequently a predetermined element (target object), for example a letter, a combination of letters or a pattern, occurs in a relatively large group of different elements, for example a text or image.

In this procedure, an image, e.g., a slide, of the group is inserted into the reference beam, and an image (slide) of the target object is inserted into the object beam. The two waves meet on the holographic medium and generate a corresponding interference pattern there. After reconstruction of the hologram formed so as to correspond to the interference pattern in the recording medium, bright correlation points are formed at the positions at which the target object is situated in the group presented, while in the event of similarity, i.e., not complete conformity, points of lower brightness appear. The image formed can be recorded, for example, by means of a camera and reproduced using a screen, but it can also be photographically recorded or displayed in visible form by means of a ground-glass plate In the case of the construction employed in the present case, the object wave and reference wave were generated by means of krypton lasers (wavelength 412 nm); both beams were polarized by the interposition of Glan-Thompson polarizers and λ/4 plates, so that they impinged on the holographic recording medium with mutually oppositely circular polarization. The read/-pump beam was likewise generated by means of a krypton laser (wavelength 568 nm), so as to be already in linearly polarized form. After passing through the hologram, a linear polarizing filter was inserted into its beam path, the filter plane of which filter could be rotated into specific angular positions in relation to the plane of polarization of the read beam.

Figure 2:
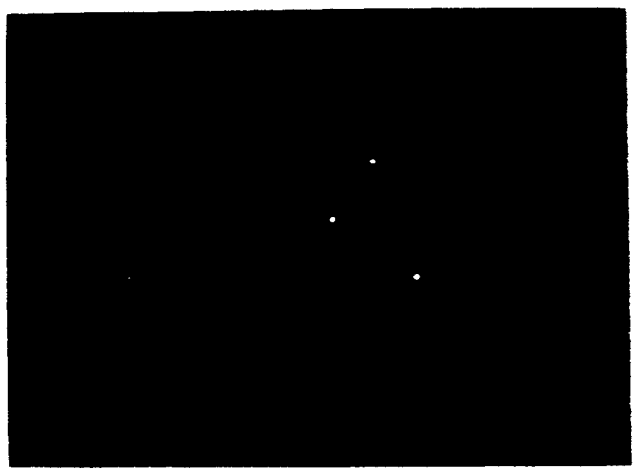
FIG. 2 shows the recorded image with the filter plane set at 90° to the plane of polarization.
Figure 3:
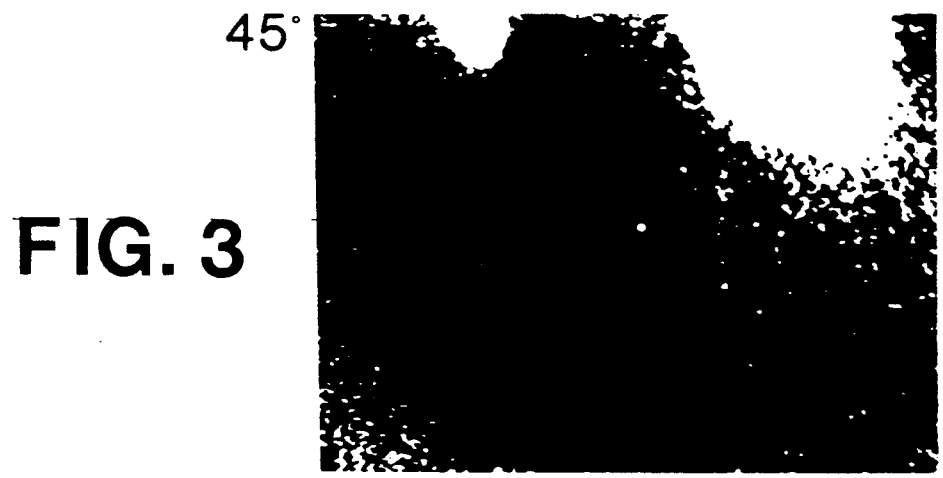
FIG. 3 shows the recorded image with the filter plane set at 45° to the plane of polarization.
Figure 4:
FIG. 4 shows the recorded image with the filter plane set at 0° to the plane of polarization.

In FIG. 1, the text which consists of three lines each containing three letters and which is used as the original in the test is shown. The object was to locate the letter "X". FIGS. 2, 3 and 4 show the images which are produced in various angular positions of the linear polarizing filter and which were recorded by means of a camera and reproduced on a screen.

FIG. 2 was recorded with a setting of the filter plane perpendicular to the plane of polarization of the read beam (the "90° position"). At this setting, the noise has completely disappeared, and the signal, by leaving three bright points, is evident entirely clearly and without disturbance, in a manner corresponding to the positions of the pattern "X" in the original.

In FIG. 3, the angle between the plane of polarization and the filter plane is 45° (the "45° position") The signal has noise superposed on it, but is still recognizable, since a component both of the noise and also of the signal can be observed.

FIG. 4 was recorded with a setting of the filter plane of the linear polarizing filter parallel to the plane of polarization of the read beam (the "0° position"). In this case, it is possible to detect only the noise which is superposed on the desired signal.

A superposition of the signal (90° position) and of the noise (0° position) can be observed if the process according to the invention is not employed; even in this case, no signal can be detected any longer.

Accordingly, while only one example of the present invention has been shown and described, it is obvious that many changes and modifications may be made thereunto without departing from the spirit and scope of the invention.

What is claimed is:

1. A process for improving the signal-to-noise ratio in holography using bacteriorhodopsin-based recording media, comprising the steps of:
    recording the hologram in said bacteriorhodopsin-based recording media using circularly polarized light; and
    reconstructing the hologram using linearly polarized light having a different wavelength than said circularly polarized light, specific beam components being selected as a function of polarization in the beam path of the reconstructed hologram.

2. A process for improving the signal-to-noise ratio in halography for real-time interferometry using bacteriorhodopsin-based recording media, comprising the steps of:
    recording the hologram in said bacteriorhodopsin-based recording media using circularly polarized light; and
    reconstructing the hologram using linearly polarized light having a different wavelength than said circularly polarized light, specific beam components being selected as a function of polarization in the beam path of the reconstructed hologram.

3. A process for improving the signal-to-noise ratio in holography for optical pattern recognition using bacteriorhodopsin-based recording media, comprising the steps of:
    inserting a spatial light modulator, e.g., a slide, containing an image of a group of objects into a reference beam;
    inserting a second spatial light modulator e.g., a slide, containing an image of a target object into an object beam;

generating an interference pattern on a holographic medium, said reference beam and said object beam having mutually oppositely circular polarization;

recording the hologram in said bacteriorhodopsin-based recording media;

reconstructing the hologram using linearly polarized light as read beam, specific beam components being selected as a function of polarization in the beam path of the reconstructed hologram.

4. The process as claimed in claim 3, wherein said bacteriorhodopsin-based recording media contains bacteriorhodopsin selected from the group consisting of wildtype bacteriorhodopsin and variants of wildtype bacteriorhodopsin as the active component.

5. The process as claimed in claim 3, wherein said bacteriorhodopsin-based recording media contain comminuted purple membrane.

6. The process as claimed in claim 3, wherein said process is used for optical filtering.

7. The process as claimed in claim 3, wherein said process is used for dynamic holographic information recording.

8. The process as claimed in claim 3, wherein said object beam and said reference beam have a wavelength which is different from said read beam.

9. The process as claimed in claim 3, wherein a linear polarizing filter is inserted into said beam path of the reconstructed hologram.

* * * * *